United States Patent
Nolte et al.

(10) Patent No.: US 10,191,166 B2
(45) Date of Patent: Jan. 29, 2019

(54) COMPLEX PORE GEOMETRY MODELING BY CONTINUOUSLY VARYING INCLUSIONS (CI) METHOD FOR ELASTIC PARAMETER PREDICTION USING INCLUSION MODELS

(71) Applicant: CGG SERVICES SAS, Massy (FR)

(72) Inventors: Eric Nolte, Richardson, TX (US); Reza Saberi, The Hague (NL)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 15/417,761

(22) Filed: Jan. 27, 2017

(65) Prior Publication Data

US 2017/0219728 A1    Aug. 3, 2017

Related U.S. Application Data

(60) Provisional application No. 62/290,524, filed on Feb. 3, 2016.

(51) Int. Cl.
| | |
|---|---|
| *G06F 19/00* | (2018.01) |
| *G01V 1/30* | (2006.01) |
| *G01V 1/28* | (2006.01) |
| *G01V 99/00* | (2009.01) |

(52) U.S. Cl.
CPC .............. *G01V 1/306* (2013.01); *G01V 1/282* (2013.01); *G01V 1/284* (2013.01); *G01V 99/005* (2013.01); *G01V 2210/6242* (2013.01); *G01V 2210/6244* (2013.01)

(58) Field of Classification Search
CPC ......... G01V 1/282; G01V 1/284; G01V 1/306
USPC .................... 702/14, 15, 182–185, 189
See application file for complete search history.

(56) References Cited

U.S. PATENT DOCUMENTS

2010/0312534 A1    12/2010  Xu et al.
2017/0275970 A1*    9/2017  Crawford ............ E21B 41/0092

FOREIGN PATENT DOCUMENTS

CN            104391342 A        3/2015

OTHER PUBLICATIONS

Brian Hornby et al., "Anisotropic effective-medium modeling of the elastic properties of shales," Society of Exploration Geophysicists, Geophysics, vol. 59, No. 10, pp. 1570-1583, Oct. 1994.
James G. Berryman, "Long-wavelength propagation in composite elastic media II. Ellipsoidal inclusions," The Journal of the Acoustical Society of America, vol. 68, No. 6, pp. 1820-1831, Dec. 1980.
(Continued)

*Primary Examiner* — Edward Raymond
(74) *Attorney, Agent, or Firm* — Patent Portfolio Builders PLLC

(57) ABSTRACT

Predicting elastic parameters of a subsurface includes modelling changes in the shear modulus and changes in the bulk modulus of the subsurface as a combination of a host medium shear modulus and host medium bulk modulus and a plurality of inclusion shear moduli and inclusion bulk moduli. Each inclusion shear modulus and inclusion bulk modulus associated with a unique inclusion geometry. An inclusion-based rock physical model is used to solve the models for changes in shear modulus and changes in bulk modulus to predict an effective shear modulus of the subsurface and an effective bulk modulus of the subsurface.

20 Claims, 2 Drawing Sheets

(56) References Cited

OTHER PUBLICATIONS

Wang Ruihe et al., "Factors influencing pore-pressure prediction in complex carbonates based on effective medium theory," School of Petroleum Engineering, China University of Petroleum (Beijing), Petroleum Science, vol. 10, No. 4, pp. 494-499, Jun. 15, 2013.
Extended European Search Report received in corresponding EP Application 17305078.2-1559, dated Jun. 14, 2017.

* cited by examiner

COMPLEX PORE GEOMETRY MODELING BY CONTINUOUSLY VARYING INCLUSIONS (CI) METHOD FOR ELASTIC PARAMETER PREDICTION USING INCLUSION MODELS

CROSS REFERENCE TO RELATED APPLICATIONS

This application claims priority and benefit from U.S. Provisional Patent Application No. 62/290,524, filed Feb. 3, 2016, for "Complex Pore Geometry Modeling by Continuously Varying Inclusions (CI) Method for Elastic Parameter Predictions", the entire content of which is incorporated herein by reference.

TECHNICAL FIELD

Embodiments of the subject matter disclosed herein generally relate to methods and systems for predicting elastic properties in a subsurface.

BACKGROUND

Seismic data acquisition surveys include both land and seabed surveys that utilize seismic receivers arranged in a pattern or grid on either the land or seabed. Seismic sources or seismic shots are created by towing or driving one or more seismic signal generators such as a seismic gun along tow lines or paths, e.g., shot lines. The seismic signal generators are then actuated at multiple locations along the tow lines or paths and the resulting seismic signals are recorded at the seismic receivers on the cables or nodes. The recorded seismic signals are then processed to yield a seismic image of the subsurface below the seismic data acquisition grid and to generate data such as the elastic properties of the subsurface.

A major challenge in seismic characterization of the subsurface is establishing a quantitative link between variations in pore geometry within the subsurface and changes in the elastic properties of the subsurface especially in carbonate rocks which tend to have complex pore geometry. Inclusion based theories are commonly used to address the issues resulting from variations in pore geometry. The inclusion based theories model wave velocity and attenuation based on scattering theory, approximating the rock as an elastic block of mineral perturbed by holes (porosity). In general, the volume fraction of the constituents and the physical and geometrical properties of the constituents alone and relative to each other are utilized in determining a solution.

An important aspect of the geometrical properties of the constituents relates to pore structure. Pore structure is typically used to include the effects of changes in the pore shape through a parameter referred to as the "pore aspect ratio". This parameter assumes pores as an ideal ellipsoid having a short axis and a long axis and is defined by dividing the length of the short axis by the length of the long axis. A common practice is to approximate the inclusion shape with a single spheroid with one optimized pore aspect ratio. Pore aspect ratio is often used to characterize the pore-space geometry in rocks, and its application ranges from hydrocarbon reservoir characterization to environmental issues. Inclusion-based rock physics theories, which are normally used to include pore structure into elastic properties, show strong dependence on the choice of pore aspect ratios. Therefore, even small changes in the aspect ratio result in different elastic properties using inclusion models.

The assumption of an ideal ellipsoid for pore shape is not a valid assumption when pore geometry deviates from a simple shape. The result is an increase in modeling error with increasing complex pore geometries regardless of the accuracy on other inputs into the inclusion model. This type of complex pore geometry is more common in sediments with secondary porosity like carbonates where diagenesis forces pores to evolve as arbitrary shapes which may not be fully approximated by an ellipsoid.

SUMMARY

Embodiments are directed to methods and systems to improve the elastic parameter predictions using inclusion based theories and introducing a new methodology to represent pore geometry. Rather than using a single-spheroid aspect ratio as an input into inclusion theories to model elastic property changes due to variations in pore shapes, a plurality of aspect ratios is used for a single pore shape. Each pore shape is approximated by more than a single spheroid, which provides an improved shape approximation for inclusion based models. Improved shape approximation is important in modeling media containing irregularly shaped inclusions, i.e., inclusion geometries that deviate significantly from regular ellipsoidal geometry. These irregularly shaped inclusion geometries include complex pore geometries.

Exemplary embodiments are direct to a method for predicting elastic parameters of a subsurface. In one embodiment, the host medium shear modulus and host medium bulk modulus are obtained. Changes in shear modulus and changes in bulk modulus of the subsurface are modeled as a combination of a host medium shear modulus and host medium bulk modulus and a plurality of inclusion shear moduli and inclusion bulk moduli. Each inclusion shear modulus and inclusion bulk modulus is associated with an unique inclusion geometry. In one embodiment, each inclusion shear modulus and each inclusion bulk modulus contributes to changes in the shear modulus and changes in the bulk modulus independent of contributions from other inclusion shear and inclusion bulk modulus terms.

In one embodiment, changes in the shear modulus and changes in the bulk modulus are modeled as a combination of a plurality of change terms, each change term comprising the host medium shear modulus and host medium bulk modulus and one of the plurality of inclusion shear moduli and inclusion bulk moduli. Each change term includes a volume fraction within the subsurface of the unique inclusion geometry of the inclusion shear modulus and inclusion bulk modulus in that change term. The volume fractions of all change terms represent a total volume of inclusions in the subsurface. In one embodiment, the combination is a summation of the plurality of change terms. In another embodiment, the combination is an integral of the change terms over a continuous path parameter. The inclusion shear modulus and the inclusion bulk modulus are a function of the continuous path parameter. In one embodiment, the integral also includes an inclusion phase density. The inclusion phase density is a function of the continuous path parameter. In one embodiment, the inclusion phase density conserves at least one of mass and pore volume in the subsurface.

An inclusion-based rock physical model is used to solve the models for changes in shear modulus and changes in bulk modulus to predict an effective shear modulus of the subsurface and an effective bulk modulus of the subsurface.

Suitable inclusion-based rock physics models include Kuster-Toksoz, differential effective medium and self-consistent approximation.

Exemplary embodiments are also directed to a computer-readable medium containing computer-executable code that when read by a computer causes the computer to perform a method for predicting elastic parameters of a subsurface. In this method, changes in shear modulus and changes in bulk modulus of the subsurface are modeled as a combination of a host medium shear modulus and host medium bulk modulus and a plurality of inclusion shear moduli and inclusion bulk moduli. Each inclusion shear modulus and inclusion bulk modulus is associated with an unique inclusion geometry. An inclusion-based rock physical model is used to solve the models for changes in shear modulus and changes in bulk modulus to predict an effective shear modulus of the subsurface and an effective bulk modulus of the subsurface.

Exemplary embodiments are directed to a computing system for predicting elastic parameters of a subsurface. The computing system includes a storage device storing a host medium shear modulus and host medium bulk modulus and a plurality of inclusion shear moduli and inclusion bulk moduli for the subsurface. A processor is included that is in communication with the storage device. The processor is configured to model changes in shear modulus and changes in bulk modulus of the subsurface as a combination of a host medium shear modulus and host medium bulk modulus and a plurality of inclusion shear moduli and inclusion bulk moduli. Each inclusion shear modulus and inclusion bulk modulus is associated with an unique inclusion geometry. The processor uses an inclusion-based rock physical model to solve the models for changes in shear modulus and changes in bulk modulus to predict an effective shear modulus of the subsurface and an effective bulk modulus of the subsurface.

In one embodiment, modelling changes in the effective shear modulus and changes in the effective bulk modulus includes modelling changes in the shear modulus and changes in the bulk modulus as a combination a plurality of change terms. Each change term includes the host medium shear modulus and host medium bulk modulus and one of the plurality of inclusion shear moduli and inclusion bulk moduli. The combination is an integral of the change terms over a continuous path parameter, and the inclusion shear modulus and inclusion bulk modulus are a function of the continuous path parameter. In one embodiment, the integral includes an inclusion phase density. The inclusion phase density is a function of the continuous path parameter.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
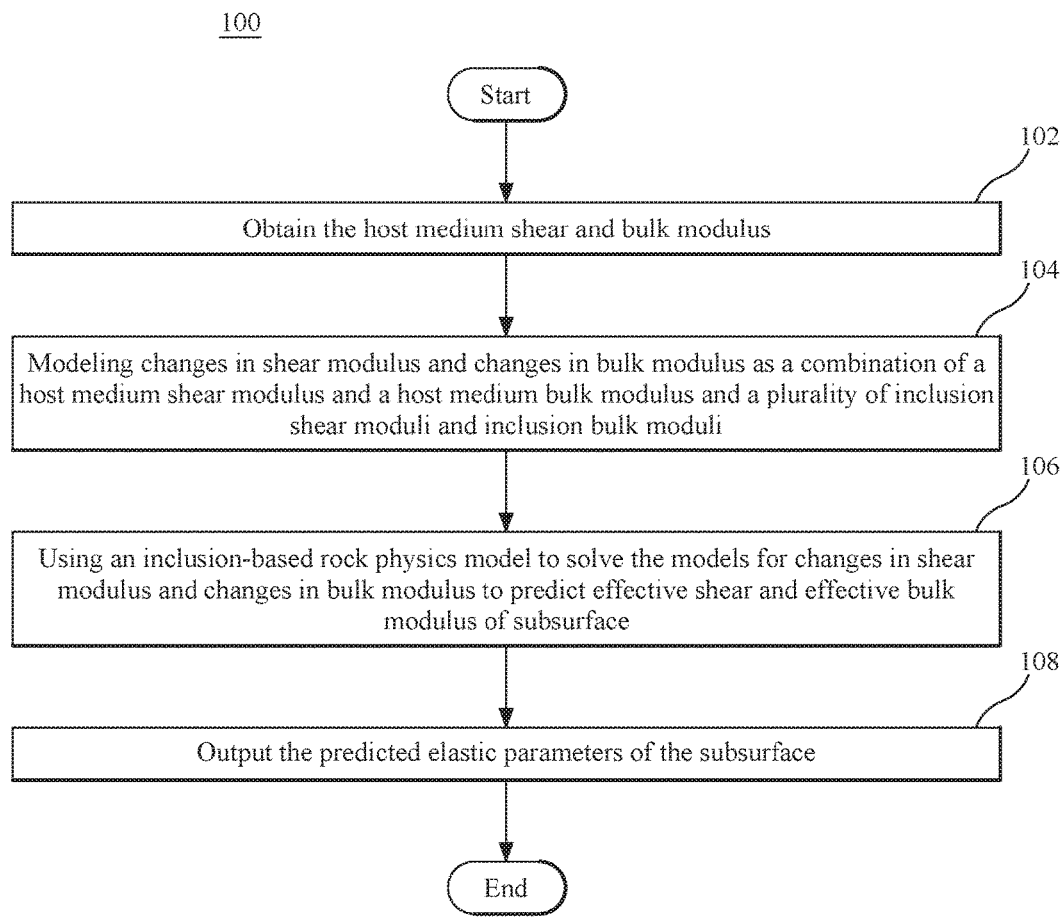
FIG. 1 is flow chart illustrating an embodiment of a method for predicting elastic parameters of a subsurface.

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Exemplary embodiments replace single-spheroid inputs with a set of spheroids for inclusion-based rock physics models that estimate or predict elastic parameters in the subsurface such as wave velocities (both compressional and shear) and attenuation. Suitable inclusion-based rock physics models include, but are not limited to, Kuster-Toksöz (KT), Differential Effective Medium (DEM), and Self-consistent Approximation (SCA). In one embodiment, each inclusion shape within the host medium of the subsurface is considered an integral of a continuous set of spheroids with different aspect ratios, using an inclusion phase density function. The inclusion phase density function approximates a physical inclusion shape by mixing a number of spheroids with known aspect ratios and volumes.

The contribution to changes in bulk and shear moduli of a media mixture due to an inclusion medium within a spheroidal pore may be represented as a function of the host medium moduli, the embedded inclusion moduli and the aspect ratio of the inclusion. Therefore, the change in the effective bulk and shear moduli of a medium containing two components, e.g., the host medium and the inclusion, can be expressed in the following forms:

$$k(K_0, G_0, K_1, G_1, \alpha_1) = (K_1 - K_0) P(K_0, G_0, K_1, G_1, \alpha_1) \quad (1)$$

$$g(K_0, G_0, K_1, G_1, \alpha_1) = (G_1 - G_0) Q(K_0, G_0, K_1, G_1, \alpha_1) \quad (2)$$

where, where, $K_0$ and $G_0$ are the bulk and shear moduli of the host medium, or the effective mineral, $K_1$ and $G_1$ are the bulk and shear moduli of the inclusion medium or the effective inclusion medium, $\alpha_1$ is the inclusion aspect ratio and P, Q are geometry-dependent coefficient functions. As used herein, effective mineral refers to the host medium and the effective rock, which is the host medium and the inclusions within the host medium These changes in the bulk modulus and shear modulus are solved using the inclusion-based rock physics models to predict the effective shear modulus and the effective bulk modulus of the subsurface. For example, the inclusion-based rock physics models KT, DEM and SCA read the changes in effective bulk modulus given in equation (1), respectively, as:

$$K'_{eff}(y) = \frac{1}{1-y} k(K_{eff}(y), G_{eff}(y), K_1, G_1, \alpha_1) \quad (3)$$

$$\sum_{i=1}^{N} x_i k(K_{\mathit{eff}}, G_{\mathit{eff}}, K_i, G_i, \alpha_i) = 0 \qquad (4)$$

$$K_{\mathit{eff}} - K_0 = \left( \frac{K_0 + \frac{4}{3}G_0}{K_{\mathit{eff}} + \frac{4}{3}G_0} \right)^{-1} \sum_{i=1}^{N} x_i k(K_0, G_0, K_i, G_i, \alpha_i) \qquad (5)$$

Exemplary embodiments expand the use of changes in the effective bulk modulus and effective shear modulus to cover multiple inclusion geometries. These multiple inclusion geometries include spheroids having different aspect ratios. Referring initially to FIG. 1, an exemplary embodiment of a method for predicting elastic parameters, e.g., effective shear modulus and effective bulk modulus, of a subsurface 100 is illustrated. Initially, the host medium shear and host medium bulk modulus are obtained 102. The host medium is a collection of minerals (also known as effective mineral) in the subsurface for which the elastic parameters are being predicted. The inclusion phase is added to this host medium (effective mineral) as a plurality of inclusion shear moduli and inclusion bulk moduli to predict saturated (or effective or effective rock) shear modulus and saturated bulk modulus of the subsurface.

Changes in shear modulus and changes in bulk modulus of the subsurface are modeled as a combination of a host medium shear modulus and host medium bulk modulus and a plurality of inclusion shear moduli and inclusion bulk moduli 104. Each inclusion shear modulus and bulk modulus are associated with a unique inclusion geometry. Therefore, different inclusions, e.g., different shaped includes or spheroid inclusions having different aspect ratios, are considered in determining changes in the saturated shear and bulk moduli within the subsurface resulting from the inclusions. In one embodiment, each unique inclusion geometry represents a unique spheroid aspect ratio.

In one embodiment, changes in the effective shear modulus and changes in the effective bulk modulus are modeled as a combination plurality of change terms. Each change term includes the host medium shear modulus and host medium bulk modulus and one of the plurality of inclusion shear moduli and inclusion bulk moduli. For a spheroid inclusion geometry, the number of ellipsoids for modeling a single pore shape is increased by generalizing equations (1) and (2) into n non-interacting inclusions types as below:

$$k(K_0, G_0, K_1, G_1, \alpha_1, \ldots, K_n, G_n, \alpha_n) = x_1(K_1 - K_0) P(K_0, G_0, K_1, G_1, \alpha_1) + \ldots + x_n(K_n - K_0) P(K_0, G_0, K_n, G_n, \alpha_n) \qquad (6)$$

$$g(K_0, G_0, K_1, G_1, \alpha_1, \ldots, K_n, G_n, \alpha_n) = x_1(G_1 - G_0) Q(K_0, G_0, K_1, G_1, \alpha_1) + \ldots + x_n(G_n - G_0) Q(K_0, G_0, K_n, G_n, \alpha_n) \qquad (7)$$

where $K_i$, $G_i$ and $\alpha_i$ are the bulk and shear moduli and aspect ratio of the $i^{th}$ inclusion medium, and $i=1, 2, \ldots, n$, with $x_1, \ldots, x_n$ representing normalized volume fractions of each components where $x_1 + \ldots + x_N = 1$. That is, $$x_i = \frac{\phi_i}{\phi},$$

where $\phi_i$ is the pore volume of the ith inclusion phase and $\phi$ the total pore volume of all inclusion phases. Therefore, each change term further includes a volume fraction within the subsurface of the unique inclusion geometry of the inclusion shear modulus and bulk modulus terms in that change term. The volume fractions of all change terms yield a total volume of inclusions in the subsurface.

An inclusion-based rock physical model is used to solve the models for changes in shear modulus and changes in bulk modulus to predict an effective shear modulus of the subsurface and an effective bulk modulus of the subsurface 106. In one embodiment, the host medium (effective mineral) shear and bulk modulus terms are also used in the inclusion-based rock physics models to predict the elastic parameters of the effective saturated subsurface medium (effective rock), i.e., the subsurface having the host medium and inclusions. Suitable inclusion-based rock physics models include, but are not limited to, Kuster-Toksoz, differential effective medium and self-consistent approximation.

In one embodiment, the bulk modulus models given by, for example, DEM, SCA and KT, respectively, and utilizing the plurality of change terms can be written as:

$$K'_{\mathit{eff}}(y) = \frac{1}{1-y} k(K_{\mathit{eff}}(y), G_{\mathit{eff}}(y), K_1, G_1, \alpha_1, \ldots, K_n, G_n, \alpha_n) \qquad (8)$$

$$k(K_{\mathit{eff}}, G_{\mathit{eff}}, K_1, G_1, \alpha_1, \ldots, K_n, G_n, \alpha_n) = 0 \qquad (9)$$

$$(K_{\mathit{eff}} - K_0) = \qquad (10)$$
$$\left( \frac{K_0 + \frac{4}{3}G_0}{K_{\mathit{eff}} + \frac{4}{3}G_0} \right)^{-1} k(K_0, G_0, K_1, G_1, \alpha_1, \ldots, K_n, G_n, \alpha_n)$$

As illustrated, equations (6) and (7) extend the changes to effective moduli of the specified medium to n inclusion types, each with a possibly different aspect ratio. The result is a plurality of inclusion terms. These terms represent mutually non-interacting pore shapes. Each inclusion shear modulus and inclusion bulk modulus contributes to the effective shear modulus and the effective bulk modulus independent of contributions from other inclusion shear moduli and inclusion bulk moduli. Therefore, pore-filling fluid cannot be moved from one pore to another (low permeability), i.e., the contribution of an inclusion phase to the moduli of the effective medium is independent of the contributions of any other inclusion phase in the combination. Non-interacting pore shapes means that (6) and (7) include no coupling terms for pores from distinct inclusion phases. The same assumption is made for non-spheroidal pores, that any two distinct pore shapes occur with sufficiently small pore volume that each inclusion shape is treated independently of any other modeled inclusion shape.

As illustrated, complex pore geometry is expressed as a summation of the different aspect ratios contained in the plurality of change terms. In another embodiment, the combination is not a summation but an integral of the aspect ratio change terms over a continuous path parameter. The inclusion shear modulus and inclusion bulk modulus are a function of this continuous path parameter. In one embodiment, the integral also includes an inclusion phase density term. The inclusion phase density is a function of the continuous path parameter. Preferably, this inclusion phase density conserves at least one of mass and pore volume in the subsurface.

In one embodiment, equations (6) and (7) are viewed as an approximation to an integral of a continuous collection of spheroidal inclusions. Subject to convergence, this results in:

$$k(K_0,G_0,K_i,G_i,\alpha_i)=\int p(s)(K_i(s)-K_0)P(K_0,G_0,K_i(s),G_i(s),\alpha_i(s))ds \quad (11)$$

$$g(K_0,G_0,K_i,G_i,\alpha_i)=\int p(s)(g_i(s)-G_0)Q(K_0,G_0,K_i(s),G_i(s),\alpha_i(s))ds \quad (12)$$

where $K_0$ and $G_0$ are the bulk and shear moduli of the host medium, or the effective mineral, and $p(s)$ is the inclusion phase density function. The inclusion density function defines the inclusion volume fractions, and setting $\int p(s)ds=1$ with K, G, and a constants converts equations (11) and (12) into equations (1) and (2) respectively. $K_i(s)$ and $G_i(s)$ are the moduli of the inclusion material with volume fraction $p(s)ds$ and aspect ratio $\alpha_i(s)$. Unlike in the discrete inclusion case, $K_i$, $G_i$, $\alpha_i$ are functions of the continuous path parameter, s, and are not a listing of a finite set of values of inclusion moduli and aspect ratios. Any given value of s defines an inclusion aspect ratio, its volume fraction, and its moduli.

Equations (3), (4) and (5) illustrated how the three inclusion-based rock physics models (DEM, SCA, and KT) read the changes in bulk modulus by assuming equations (1) and (2). Similarly, equations for these three inclusion-based rock physics models are derived using equations (11) and (12):

$$K'_{eff}(y) = \frac{1}{1-y} \int p(s)(K_i(s) - K_{eff}(y))P(K_{eff}(y), G_{eff}(y), K_i(s), G_i(s), \alpha_i(s))ds \quad (13)$$

$$\int p(s)(K_i(s) - K_{eff})P(K_{eff}, G_{eff}, K_i(s), G_i(s), \alpha_i(s))ds = 0 \quad (14)$$

$$(K_{eff} - K_0) = \left(\frac{K_0 + \frac{4}{3}G_0}{K_{eff} + \frac{4}{3}G_0}\right)^{-1} \int p(s)(K_i(s) - K_0)P(K_0, G_0, K_i(s), G_i(s), \alpha_i(s))ds \quad (15)$$

where equations (13), (14) and (15) represent DEM, SCA, and KT using equations (11) and (12).

Exemplary embodiments of the continuously varying inclusion (CI) method generalize the formula of equations (1) and (2) of the bulk and shear moduli for a medium containing just two phases, a host medium phase and an inclusion phase, by using an integral of a continuous set of spheroids with different aspect ratios that represent the inclusion phase. The inclusion phase spectrum for each pore shape is a collection of aspect ratios and their volume fractions represented by the inclusion phase density function.

The inclusion phase density ($p(s)$) represents the volume fractions of different aspect ratios, which are considered to model one single inclusion shape. This function produces a representative pore volume for all of the given aspect ratios to be used in the inclusion model. Setting $\int p(s)ds=1$ converts equations (11) and (12) into equations (1) and (2). The inclusion phase density function is general and can accept many aspect ratios. In one embodiment, two pore aspect ratios are utilized and yield a sufficiently accurate pore shape approximation. Having generated or predicted the desired elastic parameters for the subsurface, e.g., the effective shear modulus and effective bulk modulus these parameters can be output 108. In one embodiment, the predicted elastic parameters can be compared to known or existing models of the subsurface elastic parameters, and the models of the changes in the shear modulus and changes on the bulk modulus can be adjusted accordingly and solved again using the inclusion-based rock physics models. In one embodiment, adjustment of the models on of the changes in shear and bulk modulus includes modifying at least one of the number, aspect ratio or shape and volume fraction of the plurality of inclusions in the subsurface. This process can be repeated iteratively as the predicted elastic parameters converge on the modeled elastic parameters.

The inclusion phase density may be any of a wide selection of paths, which may result in non-unique results for the effective medium. This grants flexibility to a continuous inclusion model that single-shape inclusions do not possess. However, to control the final results while generalizing finite inclusion techniques, the phase density function is constrained for mass and total inclusion volume.

For a homogeneous region $\Omega$ containing a single pore region $\Phi$, the mean mass in $\Omega$ is:

$$\langle \rho \rangle_\Omega = \rho_0(1-\varphi)+\rho_1\varphi \quad (16)$$

where $\rho_0$ and $\rho_1$ are the (constant) mass densities of the host medium and inclusion medium, respectively, and $\varphi$ is total porosity, which can be considered equal to volume ($\Phi$).

With N inclusion regions:

$$\langle \rho \rangle_\Omega = \rho_0(1-\varphi)+\varphi\langle \rho_{incl}\rangle_\Phi \quad (17)$$

where $\langle \rho_{incl}\rangle_\Phi$ is the mean mass density within the total inclusion volume. For a continuous set of inclusion shapes, an expression for the mean inclusion density that reproduces equation (17) on any finite set of inclusion shapes is used. Therefore equation (17) holds in the case of a continuous set of inclusions shapes with density $\rho(s)$ and volume fraction $p(s)$, for $0 \leq s \leq 1$.

The result is:

$$\langle \rho \rangle_\Omega = \rho_0(1-\varphi)+\varphi\int_0^1 p(s)\rho(s)ds \quad (18)$$

where the mean continuous inclusion density is $\langle \rho_{incl}\rangle_\Phi = \int p(s)\rho(s)ds$ and $\int_0^1 p(s)ds=1$. When applied to a finite set of inclusion phases, this reproduces equation (17). This represents conservation of mass for a continuous set of spheroidal inclusions in a homogeneous host medium.

For $\Phi$ an inclusion of arbitrary shape with pore volume $\phi$=volume ($\Phi$), the inclusion shape is modeled using ellipsoidal spheroids. This requires $$\text{volume}(\Phi)=\langle \text{volume(spheroids)}\rangle \quad (19)$$

for any choice of component spheroids. This requirement generalizes the usual single-spheroid model to the case of an arbitrary collection of overlapping spheroids as a model of a pore of arbitrary shape. In the case of a continuous distribution of spheroids, equation (19) can be written as:

$$\varphi=\text{volume}(\Phi)=\int_0^1 p(s)\text{volume}(S(\alpha(s)))ds \quad (20)$$

where $\int_0^1 p(s)ds=1$ and $S(\alpha(s))$ denotes the spheroid with aspect ratio $\alpha(s)$. The constraint of equation (20) is the only form of mass and volume constraints that is used for the CI method. This constraint generalizes an inclusion model based on a single aspect ratio (spheroidal pore model) to a continuous distribution of aspect ratios for overlapping spheroids (non-spheroidal pore model).

Exemplary embodiments provide a more accurate definition of pore geometry over traditional concepts of single-spheroid, improving the accuracy of inclusion based theories. Single-spheroid geometry theories can fail to predict the elastic response of geometrically complicated pore volumes. With a selection of inclusion phase density, inclusion moduli, and aspect ratio function, exemplary embodiments better approximate a physical inclusion shape by mixing a number of spheroids with known aspect ratios and volumes with the given distribution. The result is a unique material model that extends inclusion-based rock physics models.

Benefits of these exemplary embodiments include a more accurate model of physical pore geometry, reduction of systematic modeling and simulation errors due to the single-spheroid geometry assumption, a systematic and predictive theory of the effects of inclusions with complex geometry on elastic parameters, more sensitive estimates of effective medium properties due to spheroidal inclusions and more accurate and more sensitive estimates of elastic parameters in complex-porosity environments. Carbonates are more susceptible for complex pore geometries, and exemplary embodiments provide a more accurate carbonate modeling. Exemplary embodiments define a simulation idiom for complex pore geometry (inverse modeling).

Exemplary embodiments predict the effective K and G for a subsurface medium containing complex inclusion shapes. Suitable applications include, but are not limited to, more accurate velocity models in environments with secondary porosity, such as carbonate-rich environments, generally more accurate velocity models, improvement to the time-to-depth conversion relationship in seismic well ties and inverse rock physics modeling to produce a pore geometry model in order to distinguish between different porosity types.

The predicted elastic parameters can be used to model or to generate an image of the subsurface. The image represents a geological parameter of the earth in the surveyed subsurface, and this parameter may be the earth reflectivity, impedance, velocity, amplitude versus offset (AVO) (AVO or amplitude variation with offset is the general term for referring to the dependency of the seismic attribute, amplitude, with the distance between the source and receiver (the offset)), etc. This image is important for many reasons for the oil and gas industry. One reason is the selection of a site for drilling a well. An accurate image of the subsurface provides clues to the location of the resource (e.g., oil and/or gas) and thus, suggests to those skilled in the art where to drill the well. Another reason is related to the monitoring of an existing production well. It is known that the production wells slowdown in time and thus, it is necessary to inject various fluids to rejuvenate the well production. The images discussed above may be used to monitor the production well, and these images will offer clues about the timing for injecting the above noted fluids, and also in which well to inject them. Images of the subsurface can also be used to determine the effectiveness of fracking operations in the subsurface and to guide the locations and conditions of those fracking operations.

Figure 2:
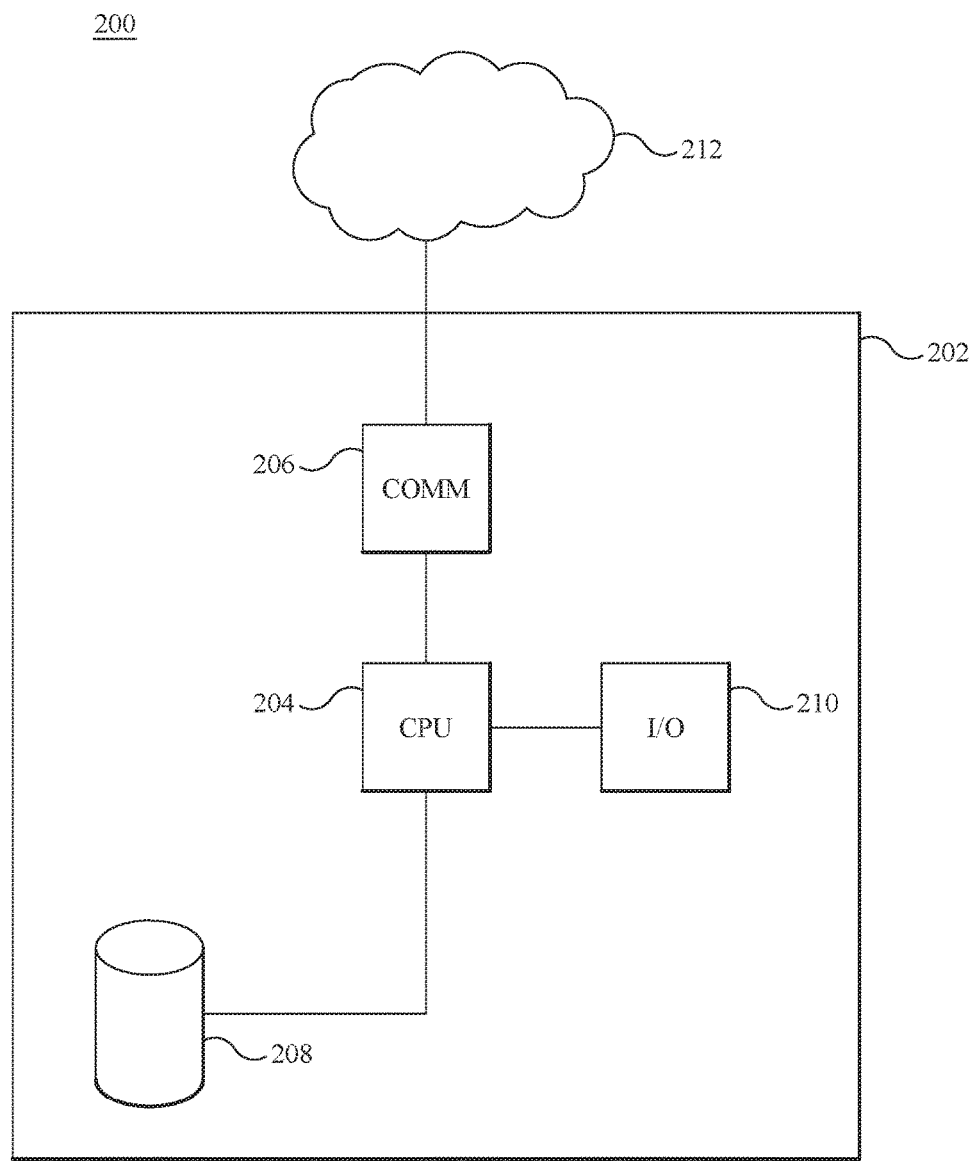
FIG. 2 is a schematic representation of an embodiment of a computing system for predicting elastic parameters of a subsurface.

Referring now to FIG. 2, exemplary embodiments are directed to a computing system 200 for predicting elastic parameters of a subsurface. In one embodiment, a computing device for performing the calculations as set forth in the above-described embodiments may be any type of computing device capable of obtaining, processing and communicating multi-vintage seismic data associated with seismic surveys conducted at different time periods. The computing system 200 includes a computer or server 202 having one or more central processing units 204 in communication with a communication module 206, one or more input/output devices 210 and at least one storage device 208.

The communication module is used to obtain seismic data recorded from a subsurface. These recorded seismic data can be obtained, for example, through the input/output devices. The communication module can also be used to obtain other data about the subsurface such as host medium shear modulus and host medium bulk modulus and a plurality of inclusion shear moduli and inclusion bulk moduli for the subsurface. The recorded seismic data and any other data for the subsurface are stored in the storage device. The input/output device can also be used to communicate or display the resulting three dimensional image of the subsurface, for example, to a user of the computing system.

The processer is in communication with the communication module and storage device and is configured to model changes in shear modulus and changes in bulk modulus of the subsurface as a combination of a host medium shear modulus and host medium bulk modulus and a plurality of inclusion shear moduli and inclusion bulk moduli. Each inclusion shear modulus and inclusion bulk modulus is associated with a unique inclusion geometry. The processor is further configured to use an inclusion-based rock physical model to solve the models for changes in shear modulus and changes in bulk modulus to predict an effective shear modulus of the subsurface and an effective bulk modulus of the subsurface. In one embodiment, modelling changes in the shear modulus and changes in the bulk modulus further includes modelling changes in the shear modulus and changes in the bulk modulus as a combination a plurality of change terms. Each change term includes the host medium shear modulus and host medium bulk modulus and one of the plurality of inclusion shear moduli and inclusion bulk moduli. The combination is an integral of the change terms over a continuous path parameter. The inclusion shear modulus and inclusion bulk modulus are a function of the continuous path parameter, and the integral also includes an inclusion phase density. The inclusion phase density is a function of the continuous path parameter.

Suitable embodiments for the various components of the computing system are known to those of ordinary skill in the art, and this description includes all known and future variants of these types of devices. The communication module provides for communication with other computing systems, databases and data acquisition systems across one or more local or wide area networks 212. This includes both wired and wireless communication. Suitable input/output devices include keyboards, point and click type devices, audio devices, optical media devices and visual displays.

Suitable storage devices include magnetic media such as a hard disk drive (HDD), solid state memory devices including flash drives, ROM and RAM and optical media. The storage device can contain data as well as software code for executing the functions of the computing system and the functions in accordance with the methods described herein. Therefore, the computing system 200 can be used to implement the methods described above associated with using an offset vector tile gather to image a subsurface. Hardware, firmware, software or a combination thereof may be used to perform the various steps and operations described herein.

Methods and systems in accordance with exemplary embodiments can be hardware embodiments, software embodiments or a combination of hardware and software embodiments. In one embodiment, the methods described herein are implemented as software. Suitable software embodiments include, but are not limited to, firmware, resident software and microcode. In addition, exemplary methods and systems can take the form of a computer program product accessible from a computer-usable or computer-readable medium providing program code for use by or in connection with a computer, logical processing unit or any instruction execution system. In one embodiment, a machine-readable or computer-readable medium contains a machine-executable or computer-executable code that when read by a machine or computer causes the machine or computer to perform a method for predicting elastic parameters of a subsurface and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages.

As used herein, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums and include non-transitory computer-readable mediums. Suitable computer-readable mediums include, but are not limited to, a semiconductor or solid state memory, magnetic tape, a removable computer diskette, a random access memory (RAM), a read-only memory (ROM), a rigid magnetic disk and an optical disk. Suitable optical disks include, but are not limited to, a compact disk-read only memory (CD-ROM), a compact disk-read/write (CD-R/W) and DVD.

The disclosed exemplary embodiments provide a computing device, software and method for predicting elastic parameters of a subsurface. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geophysics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for predicting elastic parameters of a subsurface, the method comprising:
   generating models for changes in shear modulus and changes in bulk modulus of the subsurface as a combination of a host medium shear modulus and host medium bulk modulus and a plurality of inclusion shear moduli and inclusion bulk moduli, each inclusion shear modulus and inclusion bulk modulus comprising an unique inclusion geometry; and
   using an inclusion-based rock physical model to solve the models for changes in shear modulus and changes in bulk modulus to predict an effective shear modulus of the subsurface and an effective bulk modulus of the subsurface;
   wherein the effective shear module and the effective bulk module are used to generate an image of the subsurface, the image being usable for selecting drilling sites, monitoring well production and/or designing fracking operations.

2. The method of claim 1, wherein each inclusion shear modulus and each inclusion bulk modulus contributes to changes in the shear modulus and changes in the bulk modulus independent of contributions from other inclusion shear and inclusion bulk modulus terms.

3. The method of claim 1, wherein the generating of the models for changes in the shear modulus and changes in the bulk modulus further comprises modelling changes in the shear modulus and changes in the bulk modulus as a combination of a plurality of change terms, each change term comprising the host medium shear modulus and host medium bulk modulus and one of the plurality of inclusion shear moduli and inclusion bulk moduli.

4. The method of claim 3, wherein each change term further comprises a volume fraction within the subsurface of the unique inclusion geometry of the inclusion shear modulus and inclusion bulk modulus in that change term.

5. The method of claim 4, wherein the volume fractions of all change terms comprise a total volume of inclusions in the subsurface.

6. The method of claim 3, wherein the combination comprises summation of the plurality of change terms.

7. The method of claim 3, wherein:
   the combination comprises an integral of the change terms over a continuous path parameter; and
   the inclusion shear modulus and the inclusion bulk modulus comprising a function of the continuous path parameter.

8. The method of claim 7, wherein the integral further comprises an inclusion phase density, the inclusion phase density comprising a function of the continuous path parameter.

9. The method of claim 8, wherein the inclusion phase density conserves at least one of mass and pore volume in the subsurface.

10. The method of claim 1, further comprising obtaining the host medium shear modulus and host medium bulk modulus.

11. The method of claim 1, wherein the inclusion-based rock physics models comprise Kuster-Toksoz, differential effective medium or self-consistent approximation.

12. A computer-readable medium containing computer-executable code that when read by a computer causes the computer to perform a method for predicting elastic parameters of a subsurface, the method comprising:
   generating models changes in shear modulus and changes in bulk modulus of the subsurface as a combination of a host medium shear modulus and host medium bulk modulus and a plurality of inclusion shear moduli and inclusion bulk moduli, each inclusion shear modulus and inclusion bulk modulus comprising an unique inclusion geometry; and
   using an inclusion-based rock physical model to solve the models for changes in shear modulus and changes in bulk modulus to predict an effective shear modulus of the subsurface and an effective bulk modulus of the subsurface, wherein the effective shear module and the effective bulk module are used to generate an image of the subsurface, the image being usable for selecting drilling sites, monitoring well production and/or designing fracking operations.

13. The computer-readable medium of claim 12, wherein the generating of the models for changes in the shear modulus and changes in the bulk modulus further comprises modelling changes in the effective shear modulus and changes in the effective bulk modulus as a combination of a plurality of change terms, each change term comprising the host medium shear modulus and host medium bulk modulus and one of the plurality of inclusion shear moduli and inclusion bulk moduli.

14. The computer-readable medium of claim 13, wherein:
each change term further comprises a volume fraction within the subsurface of the unique inclusion geometry of the inclusion shear modulus and inclusion bulk modulus in that change term; and
the volume fractions of all change terms comprise a total volume of inclusions in the subsurface.

15. The computer-readable medium of claim 13, wherein the combination comprises summation of the plurality of change terms.

16. The computer-readable medium of claim 13, wherein:
the combination comprises an integral of the change terms over a continuous path parameter; and
the inclusion shear modulus and inclusion bulk modulus comprising a function of the continuous path parameter.

17. The computer-readable medium of claim 16, wherein the integral further comprises an inclusion phase density, the inclusion phase density comprising a function of the continuous path parameter.

18. The computer-readable medium of claim 17, wherein the inclusion phase density conserves at least one of mass and pore volume in the subsurface.

19. A computing system for predicting elastic parameters of a subsurface, the computing system comprising:

a storage device storing host medium shear modulus and host medium bulk modulus and a plurality of inclusion shear moduli and inclusion bulk moduli for the subsurface; and a processor in communication with the storage device and configured to:

generate models for changes in shear modulus and changes in bulk modulus of the subsurface as a combination of a host medium shear modulus and host medium bulk modulus and a plurality of inclusion shear moduli and inclusion bulk moduli, each inclusion shear modulus and inclusion bulk modulus comprising an unique inclusion geometry; and use an inclusion-based rock physical model to solve the models for changes in shear modulus and changes in bulk modulus to predict an effective shear modulus of the subsurface and an effective bulk modulus of the subsurface, wherein the effective shear module and the effective bulk module are used to generate an image of the subsurface, the image being usable for selecting drilling sites, monitoring well production and/or designing fracking operations.

20. The computing system of claim 19, wherein the generating of models for changes in the effective shear modulus and changes in the effective bulk modulus further comprises modelling changes in the shear modulus and changes in the bulk modulus as a combination a plurality of change terms, each change term comprising the host medium shear modulus and host medium bulk modulus and one of the plurality of inclusion shear moduli and inclusion bulk moduli;

the combination comprises an integral of the change terms over a continuous path parameter;

the inclusion shear modulus and inclusion bulk modulus comprising a function of the continuous path parameter; and the integral further comprising an inclusion phase density, the inclusion phase density comprising a function of the continuous path parameter.

* * * * *